United States Patent [19]

Yamanashi

[11] Patent Number: 4,773,744
[45] Date of Patent: Sep. 27, 1988

[54] COMPACT ZOOM LENS SYSTEM WITH A HIGH ZOOMING RATIO

[75] Inventor: Takanori Yamanashi, Tokyo, Japan

[73] Assignee: Olympus Optical Co., Ltd., Tokyo, Japan

[21] Appl. No.: 135,090

[22] Filed: Dec. 18, 1987

[30] Foreign Application Priority Data

Dec. 18, 1986 [JP] Japan .................................. 61-300087

[51] Int. Cl.⁴ ........................ G02B 15/14; G02B 13/18
[52] U.S. Cl. ....................................... 350/427; 350/432
[58] Field of Search ......................... 350/423, 432–435, 350/427

[56] References Cited

U.S. PATENT DOCUMENTS 4,726,668 2/1988 Nakayama et al. .................. 350/427

FOREIGN PATENT DOCUMENTS 57-201213 12/1982 Japan .
58-137813 8/1983 Japan .
58-184916 10/1983 Japan .
60-57814 4/1985 Japan .

Primary Examiner—John K. Corbin
Assistant Examiner—Scott J. Sugarman
Attorney, Agent, or Firm—Cushman, Darby & Cushman

[57] ABSTRACT

A compact zoom lens system with a high zooming ratio comprises a first lens group having a positive refracting power, a second lens group having a positive refracting power and a third lens group having a negative refracting power, and is a three groups-type lens system arranged to be zoomed by respectively varying the spaces on the optical axis among the respective lens groups in which optical performance is favorable through out the zooming range.

15 Claims, 7 Drawing Sheets

COMPACT ZOOM LENS SYSTEM WITH A HIGH ZOOMING RATIO

BACKGROUND OF THE INVENTION (a) Field of the Invention

The present invention relates to a compact zoom lens system with a high zooming ratio comprising three lens groups.

(b) Description of the Prior Art

Recently, with the development of automation in camera systems, a taking lens system of a lens shutter camera which is characterized by being very easily carried has also started to become equipped with a zoom lens system. Therefore, it has been necessary to develop a compact zoom lens system.

This kind of lens system mainly installed on lens shutter cameras does not have a limitation within which the predetermined back focal length should be maintained as in the case of a lens system of single-lens reflex cameras, so that it is possible to make a lens system compact by means of shortening the back focal length.

It has been known in theory that, in order to make a lens system compact by means of shortening the back focal length, it should be effective to adopt a configuration comprising two lens groups the refracting power distribution of which is, in order from the object side, positive and negative. Compacting of, for example, a semi-wide-angle single focal lens system for a lens shutter camera and a varifocal lens system of which focal length is changeable into two states has been made possible by the above-mentioned means.

In order to make a zoom lens system small, there has been also known the zooming system comprising two lens groups having the refracting power distribution mentioned as above. From the development of this zooming system there has been also suggested a zooming system comprising three lens groups, and been proposed a number of zoom lens system for a lens shutter camera. However, the zooming ratios of these conventional zoom lens systems are about 1.5, which does not satisfy the needs of the general users who desire changes of perspective in their photographs. In order to satisfy these needs of users, it is desired for a zoom lens system to have a zooming ratio of more than 2 or at least 2. Besides, the users of lens shutter cameras have had dissatisfaction with the optical performance thereof so that it is also necessary to improve optical performance.

As a zoom lens system of this kind, there has been known the zoom lens system of two groups-type which comprises, in order from the object side, a first lens group having a positive refracting power and a second lens group having a negative refracting power as disclosed in Japanese Published Unexamined Patent Application No. 201213/82, etc. The zoom lens system having a simple lens configuration of so-called three groups-type zoom lens system in which a portion of the first or the second lens group of the two groups-type zoom lens system is divided has been disclosed in Japanese Published Unexamined Patent Application No. 137813/83.

These zoom lens systems are intended to be used in lens shutter cameras, video cameras or the like and have no necessity of consideration for the limitation of a back focal length unlike in the case of single-lens reflex cameras, so that the compactness thereof has been attained by the shortening of the back focal length.

However, in view of the compactness of a lens system and the occurrence of flare due to harmful rays etc., it is necessary also for a lens shutter camera to avoid an excess shortening of the back focal length caused by attention only to the correction of aberrations.

Moreover, despite the zooming ratio being only about 1.5, there are many lens systems in which optical performance is not sufficient, especially, the corrections of chromatic aberration and curvature of field are so deficient that there is no room for windening the zooming ratio.

In this regard, in the zoom lens system of two groups-type or that of three groups-type developed therefrom, the attempt to attain the high zooming ratio causes an increase in the maximum movement due to the zooming of the lens groups which have the role of varying the focal length and an increase in the load for magnification, so that it is difficult to attain a sufficient optical performance for the entire zooming range.

In view of the above-mentioned points, the compactness of a zoom lens system is attained by the zooming system comprising four lens groups, as shown in FIG. 1 of which refracting powers are positive, negative, positive and negative in order from the object side, namely, comprising a first lens group $G_1$ having a positive refracting power, a second lens group $G_2$ having a negative refracting power, a third lens group $G_3$ having a positive refracting power and a fourth lens group $G_4$ having a negative refracting power each group of which moves as shown in FIG. 1 during the zooming operation and each of which takes a share of the overall magnification.

There has been also known the zoom lens system comprising four lens groups where, in order to simplify the structure of the lens-barrel, the configuration of the lens groups and the movement thereof are such as shown in FIG. 2. This zooming system has been proposed in Japanese Published Unexamined Patent Application No. 57814/85 and has the characteristic that the second lens group $G_2$ is fixed during the zooming operation so that only the other three lens groups move. But, in the case where the zoom lens system of this type is intended to have larger magnification, the second lens group is fixed so that, in order to avoid the mechanical interference of the lens groups, it is necessary to sufficiently enlarge the space on the optical axis between the second lens group and the third lens group in the wide-angle position, which makes it impossible to maintain the compactness thereof.

SUMMARY OF THE INVENTION

It is, therefore, a primary object of the present invention to provide a compact zoom lens system of three groups-type with a high zooming ratio where the coverage angle of view is about 63°–23°, the zooming ratio is about 3, and, moreover, the optical performance is excellent through out the zooming range.

The zoom lens system according to the present invention is based on the four groups-type zooming system comprising four lens groups and is simplified therefrom to comprise three lens groups to thereby attain the compactness of the lens system and a high zooming ratio. That is, in the zoom lens system according to the present invention, the space on the optical axis between the second lens group and the third lens group in the four groups-type zooming system is fixed to be constant so that both the second lens group and the third lens group constitute one lens group as a whole without the deterioration of optical performance to thereby result in constitution of a three groups-type zooming system, in which the movement of each lens group during the zooming operation is extremely simple and the zooming mechanism is made to be simple.

The zoom lens according to the present invention based on the above-mentioned idea comprises, in order from the object side, a first lens group having a positive refracting power, a second lens group having a positive refracting power and a third lens group having a negative refracting power, in which the zooming is performed by respectively varying the spaces among the respective lens groups and which is characterized by satisfying the following conditions:

$$0.4 < \phi_1/\phi_W < 0.9 \quad (1)$$

$$1.1 < \phi_{12W}/\phi_W < 1.9 \quad (2)$$

$$1.5 < \beta_{3T}/\beta_{3W} < 2.8 \quad (3)$$

wherein reference symbol $\phi_W$ represents the refracting power of the zoom lens system as a whole in the wide-angle position, reference symbol $\phi_1$ represents the refracting power of the first lens group $G_1$, reference symbol $\phi_{12W}$ represents the total refracting power of the first lens group $G_1$ and the second lens group $G_2$ in the wide-angle position, reference symbol $\beta_{3W}$ represents the lateral magnification of the third lens group $G_3$ in the wide-angle position and reference symbol $\beta_{3T}$ represents the lateral magnification of the third lens group $G_3$ in the telephoto position.

In the zoom lens system of four groups-type as shown in FIG. 1, the zooming ratio shared by the third lens group during the zooming operation is comparatively small. With attention being paid to this, the present invention was achieved from the finding that the role of the third lens group is, rather than to share the zooming, to mainly improve the optical performance, for example, to maintain the flatness of field of curvature. That is, in the present invention, there has been found the possibility for the second lens group and the third lens group of the zoom lens system of the four groups-type to constitute one lens group with the proper space therebetween on the optical axis.

The problem for the function of flattening curvature of field which the third lens group had possessed has been solved by means of the adjustment of the spaces among the other lens groups on the optical axis or arranging an air-lens having a strong function between the lens components which constitute the given lens group.

The zoom lens system according to the present invention employs a so-called three groups-type zooming system comprising three lens groups in which the first lens group $G_1$ and the second lens group $G_2$ constitute one lens group having a positive refracting power as a whole, and this lens group and the following third lens group $G_3$ having a negative refracting power constitute a lens system such as of telescopic type to thereby make it possible to shorten the total length of the lens system and to make the lens system compact.

Moreover, in the zoom lens system according to the present invention, it is possible to decrease the number of the lens components which constitute the second lens group, which also makes it possible to provide a compact system. In other words, in the case of the four groups-type zooming system, the second lens group and the third lens group are independent of each other so that aberrations can be corrected in the respective lens groups. Therefore, usually, in order to maintain the variation of aberrations during the zooming to be small, the number of the lens components constituting the respective lens groups becomes inevitably large so that it is difficult to decrease the number of the lens components in the lens system as a whole. On the contrary, in the zoom lens system according to the present invention, the second lens group and the third lens group in the four groups-type zoom lens system constitute one lens group (the second lens group $G_2$) and this makes it possible to decrease the number of lens components constituting the second lens group $G_2$.

As for the enlargement of the zooming ratio, the present invention intends to make the lens system compact mainly in the wide-angle position and at the same time, intends to enlarge the zooming ratio by means of sharing a zooming ratio between the second lens group $G_2$ and the third lens group $G_3$. Especially, in the present invention, the zooming ratio is shared between two lens groups as is explained above and the length of the second lens group $G_2$ is not varied so that the total length of the lens system becomes shorter in the wide-angle position and becomes longer in the telephoto position compared with that of the usual four groups-type zooming system. Further, that the total length of the lens system becomes large in the telephoto position means the enlargement of the telephoto ratio, which is advantageous to and no problem in the correction of aberrations.

As explained above, the zoom lens system according to the present invention is based on the four groups-type zooming system and is converted into three groups-type zooming system by an arrangement whereby, while maintaining a large zooming ratio and high performance, the zooming mechanism becomes simple enabling the lowering of costs including those of the manufacturing process and the total length of the lens system becomes short and compact.

As explained above, the zoom lens system according to the present invention comprises, in order from the object side, a first lens group having a positive refracting power, a second lens group having a positive refracting power and a third lens group having a negative refracting power. However, in order to obtain the lens system having a favourable performance which attains the object of the present invention, it is important to suitably arrange the distribution of the refracting power. The above-mentioned conditions (1), (2) and (3) are established for this purpose.

The condition (1) is necessary to regulate the refracting power of the first lens group $G_1$ in the zoom lens system according to the present invention, to control the magnification shared by the second lens group $G_2$ and the moving amount thereof during the zooming operation and to attain the favourable correction of aberrations.

When the refracting power is set as $\phi_W$ and the total length of the lens system is set as $J_W$ in the wide-angle position of the three groups-type zooming system, the following formulae (i), (ii) and (iii) are concluded:

$$\phi_W = \phi_1 \cdot (1 - e_{2W} \cdot \phi_3) + (1 - e_{1W} \cdot \phi_1) \cdot \quad (i)$$

$$(\phi_2 + \phi_3 - e_{2W}\phi_2 \cdot \phi_3)$$

$$J_W = e_{1W} + e_{2W} + l'_W \quad (ii)$$

$$l'_W = \frac{-\phi_1 e_{2W} + (1 - e_{1W} \cdot \phi_1) \cdot (1 - e_{2W} \cdot \phi_2)}{\phi_W} \quad (iii)$$

wherein reference symbols $\phi_1$, $\phi_2$ and $\phi_3$ respectively represent the refracting powers of the first lens group $G_1$, the second lens group $G_2$ and the third lens group $G_3$, reference symbol $e_{1W}$ represents the space between the principal point of the first lens group $G_1$ and that of the second lens group $G_2$ in the wide-angle position, reference symbol $e_{1T}$ represents the space between the principal point of the first lens group $G_1$ and that of the second lens group $G_2$ in the telephoto position, reference symbol $e_{2W}$ represents the space between the principal point of the second lens group $G_2$ and that of the third lens group $G_3$ in the wide-angle position, reference symbol $e_{2T}$ represents the space between the principal point of the second lens group $G_2$ and that of the third lens group $G_3$ in the telephoto position, reference symbol $l'_W$ represents the back focal length in the wide-angle position.

As is evident from the above mentioned formulae (1), (2) and (3), when the upper limit of the condition (1) is exceeded, which helps to shorten the total length of the lens system in the wide-angle position, the back focal length of the lens system becomes too short and the diameter of the third lens group $G_3$ becomes large, which is not favourable. As for the correction of aberrations, moreover, Petzval's sum has a tendency to be overcorrected and chromatic aberration of magnification has also a tendency to be large, which becomes a problem. When the lower limit of the condition (1) is exceeded, which helps the correction of aberrations, it becomes difficult to maintain the total length of the lens system short and the first lens group becomes unsuitable as a focusing lens group, which is not favourable.

The condition (2) is established for regulating the total refracting power of the first lens group $G_1$ and the second lens group $G_2$ in the wide-angle position, and is an important condition for deciding the refracting power of the second lens group $G_2$ so as to make the lens system compact on the premise that the condition (1) is satisfied.

When the upper limit of the condition (2) is exceeded, which is extremely effective for shortening the total length of the lens system in the wide-angle position, there is an increase in the amounts of various aberrations including chromatic aberration generated by the function of the overcorrection of Pezval's sum so that it becomes difficult to correct these aberrations by means of the third lens group and it is impossible to obtain the favourable performance. When the lower limit of the condition (2) is exceeded, which helps the correction of aberrations, it becomes difficult to shorten the total length of the lens system in the wide-angle position and the refracting power of the third lens group $G_3$ becomes weak. And, the position of the rear principal plane enters into the lens system and back focal length becomes short so that the diameter of the lens becomes large, which is contrary to the object of the present invention.

The condition (3) is established for regulating the lateral magnification (hereinafter simply called "magnification") shared by the third lens group $G_3$ so as to obtain a predetermined magnification.

When the upper limit of the condition (3) is exceeded, the magnification shared by the third lens group $G_3$ during the zooming operation becomes very large and the maximum moving amount thereof for zooming operation increases. As a result, the zooming ratio of the second lens group $G_2$ becomes very small, and the employment of the three groups-type zooming system becomes meaningless. When the lower limit of the condition (3) is exceeded, it becomes necessary to enlarge the zooming ratio shared by the second lens group $G_2$ and to employ the zooming system where the space on the optical axis between the second lens group $G_2$ and the third lens group $G_3$ in the wide-angle position is made to be large and the second lens group $G_2$ is made to be moved during the zooming operation on the basis of the wide-angle position thereof which renders the shortening of the total length of the lens system difficult.

Once the arrangement of the paraxial refracting power is determined, the magnification shared by the third lens group $G_3$ is decided by the moving amount of the third lens group $G_3$ during the zooming operation and the magnification shared by the second lens group $G_2$ is decided by the relationship of the relative position with respect to the other lens groups. In other words, when the magnifcations of the second lens group $G_2$ and the third lens group $G_3$ are respectively set as reference symbol $\beta_{2W}$ and $\beta_{3W}$, they are respectively expressed by the following formulae:

$$\beta_{3W} = 1 - l'_W \cdot \phi_3 \qquad \text{(vi)}$$
$$\beta_{2W} = \frac{\phi_1}{\phi_W \beta_{3W}} \qquad \text{(v)}$$

As explained above, the zoom lens system according to the present invention comprises the first positive lens group $G_1$, the second positive lens group $G_2$ and the third negative lens group $G_3$, and is characterized in that the arrangement of the refracting power on the paraxial constitution and the movement of the respective lens groups are suitably determined so as to satisfy the conditions (1), (2) and (3). However, in order to obtain a favourable performace through out the zooming range, it is desirable to arrange each lens group as follows.

That is, as shown in FIGS. 4, 5 and 6, it is desirable that the first lens group $G_1$ should comprise at least one negative lens component and at least one positive lens component, the second lens group $G_2$ should comprise the front lens group $G_{21}$ having at least one negative lens component and at least one positive lens component and the rear lens group $G_{22}$ having two or more positive lens components and at least one negative lens component, and the third lens group $G_3$ should comprise at least one positive lens component and at least one negative lens component.

In the zoom lens system according to the present invention, in order to make the zooming ratio larger and to make optical performance more favourable, it is effective to employ an aspherical surface therein. In the case where an aspherical surface is employed in the first lens group $G_1$ or the second lens group $G_2$, it becomes possible to lighten the load of the lens component and to make the refractive index thereof lower to thereby make it possible to design the lens system with allowances and to improve optical performance.

When x is set as the direction of the optical axis, y is set as the vertical direction to the optical axis and the radius of curvature of an aspherical surface at the vertex thereof (the radius of curvature of a standard spherical surface) is set as $r_k$, the shape of the aspherical surface is expressed by the following formula:

$$x_k = \frac{y_k^2}{r_k + r_k\sqrt{1 - (y_k/r_k)^2}} + A_k y_k^4 + B_k y_k^6 + C_k y_k^8 + D_k y_k^{10}$$

wherein $A_k$, $B_k$, $C_k$ and $D_k$ respectively represent the coefficients of the aspherical surface and k means that the aspherical surface is the k-th surface in the lens system.

DETAILED DESCRIPTION OF THE PREFERRED EMBODIMENTS

Now, preferred embodiments of the zoom lens system according to the present invention are shown below.

Figure 1:
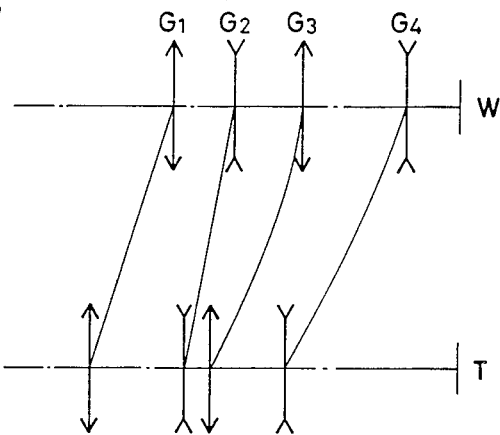
FIGS. 1 and 2 show schematic views of the movements of the lens groups in the conventional four groups-type zooming systems.
Figure 2:
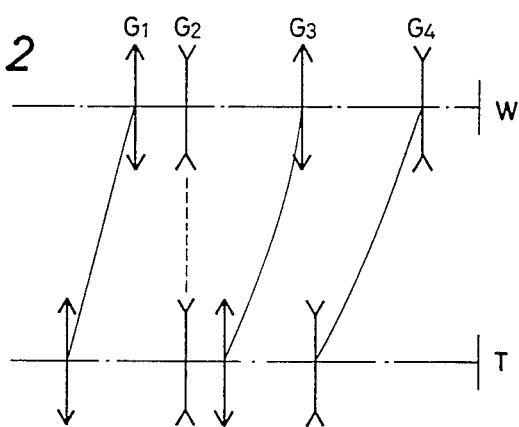

Embodiments according to the present invention are represented basically by the embodiment shown in FIG. 2 and the configurations of the resepctive lens groups thereof are such as explained in the above.

Figure 3:
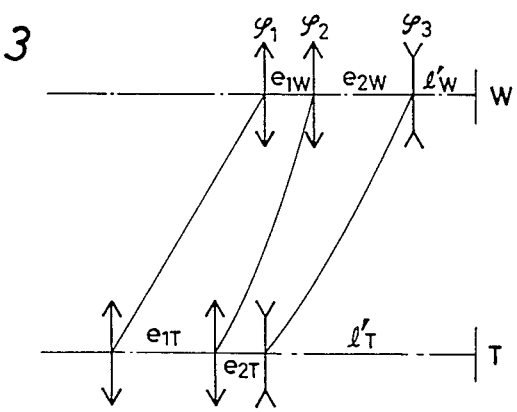
FIG. 3 shows a schematic view of the movement of the lens groups during the zooming operation in a zoom lens system according to the present invention.

That is, in the zoom lens system according to the present invention, the first lens group $G_1$ comprises, in order from the object side, a negative meniscus lens having a convex surface thereof directed toward the object, a positive lens and another positive lens. Between the negative meniscus lens and the following positive lens is arranged as an air lens. As a result, the refracting powers are arranged suitably and the amount of aberrations generated is controlled to be small. The first lens group $G_1$ may comprise two components as shown in FIG. 3. In this case, the load of each lens becomes large and the radius of curvature of each surface thereof becomes strong, which causes a tendency that the thickness thereof has to be large. However, the object of the present invention will be attained without any problem when the refracting power of the first lens group $G_1$ is set as the value near the lower limit of the condition (1) and the lens group other than the first lens group $G_1$ is used as the focusing lens group.

The second lens group $G_2$ comprises the front lens group $G_{21}$ having, in order from the object side, a negative lens and a positive lens and the rear lens group $G_{22}$ having, in order from the object side, two positive lenses, a negative lens and a positive lens. This front lens group $G_{21}$ may comprise a doublet in which the negative lens and the positive lens are cemented, but, in order to sufficiently correct various monochromatic aberrations, it is more effective to arrange an air-lens therebetween. Another negative lens component may be also arranged thereafter as shown in embodiment 4 according to the present invention. Especially, in the case where the negative lens and the positive lens are cemented to be a doublet, which is advantageous to the correction of axial chromatic aberration but disadvantageous to the correction of coma, etc., it is desirable to arrange another negative lens component to follow. As explained in the above, the front lens group $G_{21}$ of the second lens group $G_2$ contributes largely to the balance among coma, distortion and astigmatism in the total system, and the function therefor of the nearest surface to the object side is so large that the function of overcorrecting these aberrations becomes strong. Because of this, aberrations generated by other lenses are well-corrected with good balance and aberrations of the total system are corrected favourably.

The rear lens group $G_{22}$ of the second lens group $G_2$ is positioned where the incident height of the axial ray becomes large and, because of the employment of the configuration as described above, the front principal point is positioned on the object side, which is advantageous to the correction of spherical aberration. The object side surface of the negative lens in this rear lens group $G_{22}$ generates the higher-order aberration, and has a large influence upon the balance of aberrations of the third lens group $G_3$. It is important to have the surface function efficiently also in order to correct aberrations of the total system.

The third lens group $G_3$ comprises, in order from the object side, a positive meniscus lens and a negative lens and contributes to maintaining the flatness of an image surface. The higher-order aberration is generated by the function of the air-lens arranged between both lenses of this lens group, and suitably cancels aberrations generated by the first lens group $G_1$ through the third lens group $G_3$.

Numerical data of preferred embodiments according to the present invention are as follows:

Embodiment 1

| $f = 39.7-101.0$ $2\omega = 57.173°-24.179°$ | | F/4.66-6.3 |
| --- | --- | --- |
| $r_1 = 349.6939$ | | |
| $d_1 = 1.5000$ | $n_1 = 1.83400$ | $\nu_1 = 37.16$ |
| $r_2 = 32.8369$ | | |
| $d_2 = 1.1000$ | | |
| $r_3 = 41.7711$ | | |
| $d_3 = 3.4800$ | $n_2 = 1.61700$ | $\nu_2 = 62.79$ |
| $r_4 = 298.9985$ | | |
| $d_4 = 0.2000$ | | |
| $r_5 = 28.3460$ | | |
| $d_5 = 5.2000$ | $n_3 = 1.51633$ | $\nu_3 = 64.15$ |
| $r_6 = -98.2782$ | | |
| $d_6 = D_1$ (variable) | | |
| $r_7 = -33.2301$ | | |
| $d_7 = 1.3000$ | $n_4 = 1.77250$ | $\nu_4 = 49.66$ |
| $r_8 = 21.7220$ | | |
| $d_8 = 0.8000$ | | |
| $r_9 = 27.4664$ | | |
| $d_9 = 2.5100$ | $n_5 = 1.80518$ | $\nu_5 = 25.43$ |
| $r_{10} = -442.8216$ | | |
| $d_{10} = 9.8233$ | | |
| $r_{11} = \infty$ (diaphragm) | | |
| $d_{11} = 1.9126$ | | |
| $r_{12} = -145.0362$ | | |
| $d_{12} = 2.8000$ | $n_6 = 1.62004$ | $\nu_6 = 36.25$ |
| $r_{13} = -30.1680$ | | |
| $d_{13} = 0.1000$ | | |
| $r_{14} = 25.4422$ | | |
| $d_{14} = 4.0000$ | $n_7 = 1.58904$ | $\nu_7 = 53.20$ |
| $r_{15} = -26.8413$ | | |
| $d_{15} = 1.1500$ | | |
| $r_{16} = -20.2236$ | | |
| $d_{16} = 1.6200$ | $n_8 = 1.74000$ | $\nu_8 = 28.29$ |
| $r_{17} = 28.1734$ | | |
| $d_{17} = 2.3620$ | | |

-continued

| | | |
|---|---|---|
| $r_{18} = 56.8798$ | | |
| $d_{18} = 3.2900$ | $n_9 = 1.56873$ | $\nu_9 = 63.16$ |
| $r_{19} = -20.1313$ | | |
| $d_{19} = D_2$ (variable) | | |
| $r_{20} = -32.6159$ | | |
| $d_{20} = 3.2970$ | $n_{10} = 1.78472$ | $\nu_{10} = 25.68$ |
| $r_{21} = -18.0559$ | | |
| $d_{21} = 1.5068$ | | |
| $r_{22} = -17.1348$ | | |
| $d_{22} = 1.60$ | $n_{11} = 1.77250$ | $\nu_{11} = 49.66$ |
| $r_{23} = 125.4215$ | | |

| f | $D_1$ | $D_2$ |
|---|---|---|
| 39.7 | 3.799 | 18.09 |
| 63.37 | 10.836 | 9.229 |
| 101.0 | 15.815 | 2.637 |

| $\phi_1/\phi_W = 0.568$ | $\phi_{12W}/\phi_W = 1.342$ | $\beta_{3T}/\beta_{3W} = 1.874$ |
|---|---|---|

Embodiment 2

| $f = 39.7-101.0$ | | F/4.66-6.3 |
|---|---|---|
| $2\omega = 57.173°-24.179°$ | | |

| | | |
|---|---|---|
| $r_1 = 349.6816$ | | |
| $d_1 = 1.5000$ | $n_1 = 1.83400$ | $\nu_1 = 37.16$ |
| $r_2 = 33.1266$ | | |
| $d_2 = 1.1000$ | | |
| $r_3 = 40.4902$ | | |
| $d_3 = 3.4800$ | $n_2 = 1.61700$ | $\nu_2 = 62.79$ |
| $r_4 = 265.0133$ | | |
| $d_4 = 0.2000$ | | |
| $r_5 = 29.1601$ | | |
| $d_5 = 5.2000$ | $n_3 = 1.51633$ | $\nu_3 = 64.15$ |
| $r_6 = -98.4163$ | | |
| $d_6 = D_1$ (variable) | | |
| $r_7 = -33.5563$ | | |
| $d_7 = 1.3000$ | $n_4 = 1.77250$ | $\nu_4 = 49.66$ |
| $r_8 = 21.4788$ | | |
| $d_8 = 0.8000$ | | |
| $r_9 = 29.3344$ | | |
| $d_9 = 2.5100$ | $n_5 = 1.80518$ | $\nu_2 = 25.43$ |
| $r_{10} = -202.5157$ | | |
| $d_{10} = 9.8233$ | | |
| $r_{11} = \infty$ (diaphragm) | | |
| $d_{11} = 1.9126$ | | |
| $r_{12} = -140.9364$ | | |
| $d_{12} = 2.8000$ | $n_6 = 1.62004$ | $\nu_6 = 36.25$ |
| $r_{13} = -29.7929$ | | |
| $d_{13} = 0.1000$ | | |
| $r_{14} = 26.3380$ | | |
| $d_{14} = 4.0000$ | $n_7 = 1.58904$ | $\nu_7 = 53.20$ |
| $r_{15} = -26.3893$ | | |
| $d_{15} = 1.1500$ | | |
| $r_{16} = -20.3390$ | | |
| $d_{16} = 1.6180$ | $n_8 = 1.74000$ | $\nu_8 = 28.29$ |
| $r_{17} = 27.7863$ | | |
| $d_{17} = 2.3620$ | | |
| $r_{18} = 58.0692$ | | |
| $d_{18} = 3.2900$ | $n_9 = 1.56873$ | $\nu_9 = 63.16$ |
| $r_{19} = -19.7462$ | | |
| $d_{19} = D_2$ (variable) | | |
| $r_{20} = -33.4189$ | | |
| $d_{20} = 3.2970$ | $n_{10} = 1.78472$ | $\nu_{10} = 25.68$ |
| $r_{21} = -18.2086$ | (aspherical surface) | |
| $d_{21} = 1.5068$ | | |
| $r_{22} = -17.1355$ | | |
| $d_{22} = 1.60$ | $n_{11} = 1.77250$ | $\nu_{11} = 49.66$ |
| $r_{23} = 125.4196$ | | |

| f | $D_1$ | $D_2$ |
|---|---|---|
| 39.7 | 3.689 | 18.101 |
| 63.37 | 10.743 | 9.229 |
| 101.0 | 15.773 | 2.637 |

Coefficients of the aspherical surface $A_{21} = -0.30556 \times 10^{-7}$
$B_{21} = -0.62359 \times 10^{-8}$
$C_{21} = -0.34506 \times 10^{-10}$
$D_{21} = 0.73479 \times 10^{-13}$ -continued

| $\phi_1/\phi_W = 0.562$ | $\phi_{12W}/\phi_W = 1.346$ | $\beta_{3T}/\beta_{3W} = 2.132$ |
|---|---|---|

Embodiment 3

| $f = 42.32-100.285$ | | F/4.66-6.30 |
|---|---|---|
| $2\omega = 54.15°-24.346°$ | | |

| | | |
|---|---|---|
| $r_1 = 125.1043$ | | |
| $d_1 = 1.5000$ | $n_1 = 1.80518$ | $\nu_1 = 25.43$ |
| $r_2 = 47.5460$ | | |
| $d_2 = 0.3000$ | | |
| $r_3 = 36.1310$ | | |
| $d_3 = 5.7526$ | $n_2 = 1.60300$ | $\nu_2 = 65.48$ |
| $r_4 = -90.2949$ | | |
| $d_4 = D_1$ (variable) | | |
| $r_5 = -34.0683$ | | |
| $d_5 = 1.3000$ | $n_3 = 1.80610$ | $\nu_3 = 40.95$ |
| $r_6 = 20.9841$ | | |
| $d_6 = 0.8000$ | | |
| $r_7 = 21.9772$ | | |
| $d_7 = 2.5064$ | $n_4 = 1.80518$ | $\nu_4 = 25.43$ |
| $r_8 = -158.6470$ | | |
| $d_8 = 12.5417$ | | |
| $r_9 = \infty$ (diaphragm) | | |
| $d_9 = 1.9126$ | | |
| $r_{10} = -49.9427$ | | |
| $d_{10} = 3.1886$ | $n_5 = 1.62374$ | $\nu_5 = 47.10$ |
| $r_{11} = -24.3730$ | | |
| $d_{11} = 0.1003$ | | |
| $r_{12} = 27.7653$ | | |
| $d_{12} = 4.0000$ | $n_6 = 1.60700$ | $\nu_6 = 54.98$ |
| $r_{13} = -35.8977$ | | |
| $d_{13} = 1.0889$ | | |
| $r_{14} = -17.0433$ | | |
| $d_{14} = 1.9157$ | $n_7 = 1.68893$ | $\nu_7 = 31.08$ |
| $r_{15} = 27.5919$ | | |
| $d_{15} = 2.3350$ | | |
| $r_{16} = 47.4714$ | | |
| $d_{16} = 3.2857$ | $n_8 = 1.56873$ | $\nu_8 = 63.16$ |
| $r_{17} = -16.6553$ | | |
| $d_{17} = D_2$ (variable) | | |
| $r_{18} = -34.4099$ | | |
| $d_{18} = 3.2968$ | $n_9 = 1.80518$ | $\nu_9 = 25.43$ |
| $r_{19} = -17.9647$ | | |
| $d_{19} = 1.5001$ | | |
| $r_{20} = -16.9841$ | (aspherical surface) | |
| $d_{20} = 1.6014$ | $n_{10} = 1.77250$ | $\nu_{10} = 49.66$ |
| $r_{21} = 96.8592$ | | |

| f | $D_1$ | $D_2$ |
|---|---|---|
| 42.32 | 3.418 | 15.977 |
| 65.427 | 8.457 | 8.12 |
| 100.285 | 11.922 | 2.5 |

Coefficients of the aspherical surface $A_{20} = -0.30778 \times 10^{-5}$
$B_{20} = 0.66899 \times 10^{-8}$
$C_{20} = 0.23522 \times 10^{-10}$
$D_{20} = -0.12635 \times 10^{-12}$

| $\phi_1/\phi_W = 0.54$ | $\phi_{12W}/\phi_W = 1.414$ | $\beta_{3T}/\beta_{3W} = 2.103$ |
|---|---|---|

Embodiment 4

| $f = 39.50-101.17$ | | F/4.66-6.25 |
|---|---|---|
| $2\omega = 57.42°-24.14°$ | | |

| | | |
|---|---|---|
| $r_1 = 514.2920$ | | |
| $d_1 = 1.6500$ | $n_1 = 1.83400$ | $\nu_1 = 37.16$ |
| $r_2 = 29.9752$ | | |
| $d_2 = 1.1000$ | | |
| $r_3 = 38.3788$ | | |
| $d_3 = 3.4800$ | $n_2 = 1.61272$ | $\nu_2 = 58.75$ |
| $r_4 = 545.9696$ | | |
| $d_4 = 0.2000$ | | |
| $r_5 = 26.6491$ | | |
| $d_5 = 5.1985$ | $n_3 = 1.56384$ | $\nu_3 = 60.69$ |
| $r_6 = -144.2861$ | | |

-continued

```
d6 = D1 (variable)
r7 = −35.8957
d7 = 1.6000          n4 = 1.78590    ν4 = 44.18
r8 = 23.7432
d8 = 0.7273
r9 = 34.6847
d9 = 2.6079          n5 = 1.78470    ν5 = 26.22
r10 = −57.2934
d10 = 1.8842
r11 = −46.5250
d11 = 2.0000         n6 = 1.69680    ν6 = 55.52
r12 = −147.2930
d12 = 4.5532
r13 = ∞(diaphragm)
d13 = 3.5670
r14 = −124.2781
d14 = 2.8357         n7 = 1.64769    ν7 = 33.80
r15 = −28.3627
d15 = 0.3311
r16 = 35.2215
d16 = 3.9213         n8 = 1.62230    ν8 = 53.20
r17 = −40.9712
d17 = 1.0764
r18 = −22.1258
d18 = 1.5365         n9 = 1.74000    ν9 = 28.29
r19 = 30.0629
d19 = 0.8217
r20 = 39.3474
d20 = 4.0885         n10 = 1.61272   ν10 = 58.75
r21 = −19.5679
d21 = D2 (variable)
r22 = −30.1423
d22 = 3.6788         n11 = 1.78472   ν11 = 25.71
r23 = −18.6415
d23 = 1.6503
r24 = −17.9809
d24 = 1.7821         n12 = 1.77250   ν12 = 49.66
r25 = 116.7552
```

| f | D1 | D2 |
|---|---|---|
| 39.50 | 2.789 | 17.909 |
| 62.86 | 11.997 | 9.483 |
| 101.17 | 16.227 | 2.824 |

| $\phi_1/\phi_W = 0.640$ | $\phi_{12W}/\phi_W = 1.375$ | $\beta_{3T}/\beta_{3W} = 2.050$ |
|---|---|---| wherein reference symbol f represents the focal length of the lens system as a whole, reference symbol F/ represents the relative aperture of the lens system, reference symbol 2ω represents the angle of view of the lens system, reference symbol $r_1, r_2, \ldots$ respectively represent radii of curvature of respective lens surfaces, reference symbol $d_1, d_2, \ldots$ respectively represent thicknesses of respective lenses and airspaces between respective lenses, reference symbol $n_1, n_2, \ldots$ respectively represent refractive indices of respective lenses and reference symbol $\nu_1, \nu_2, \ldots$ respectively represent Abbe's numbers of respective lenses.

Figure 4:
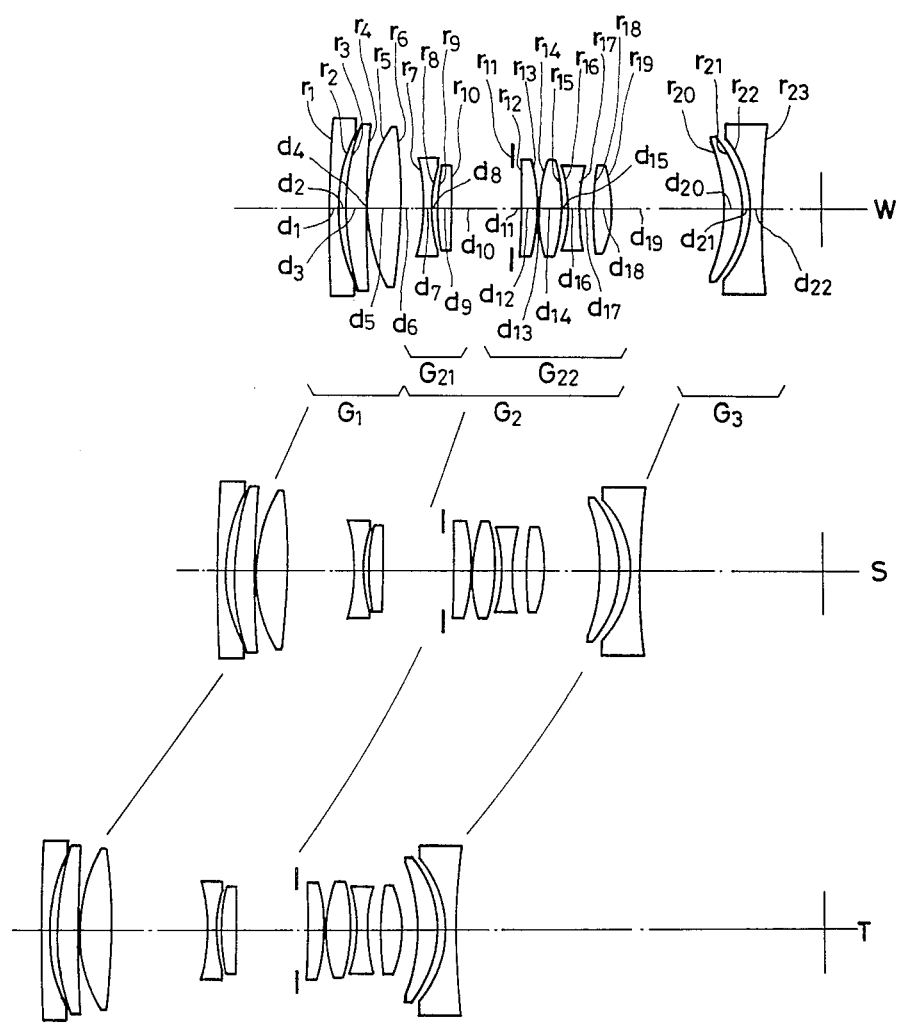
FIG. 4 shows a schematic sectional view of embodiments 1 and 2 according to the present invention.
Figure 7:
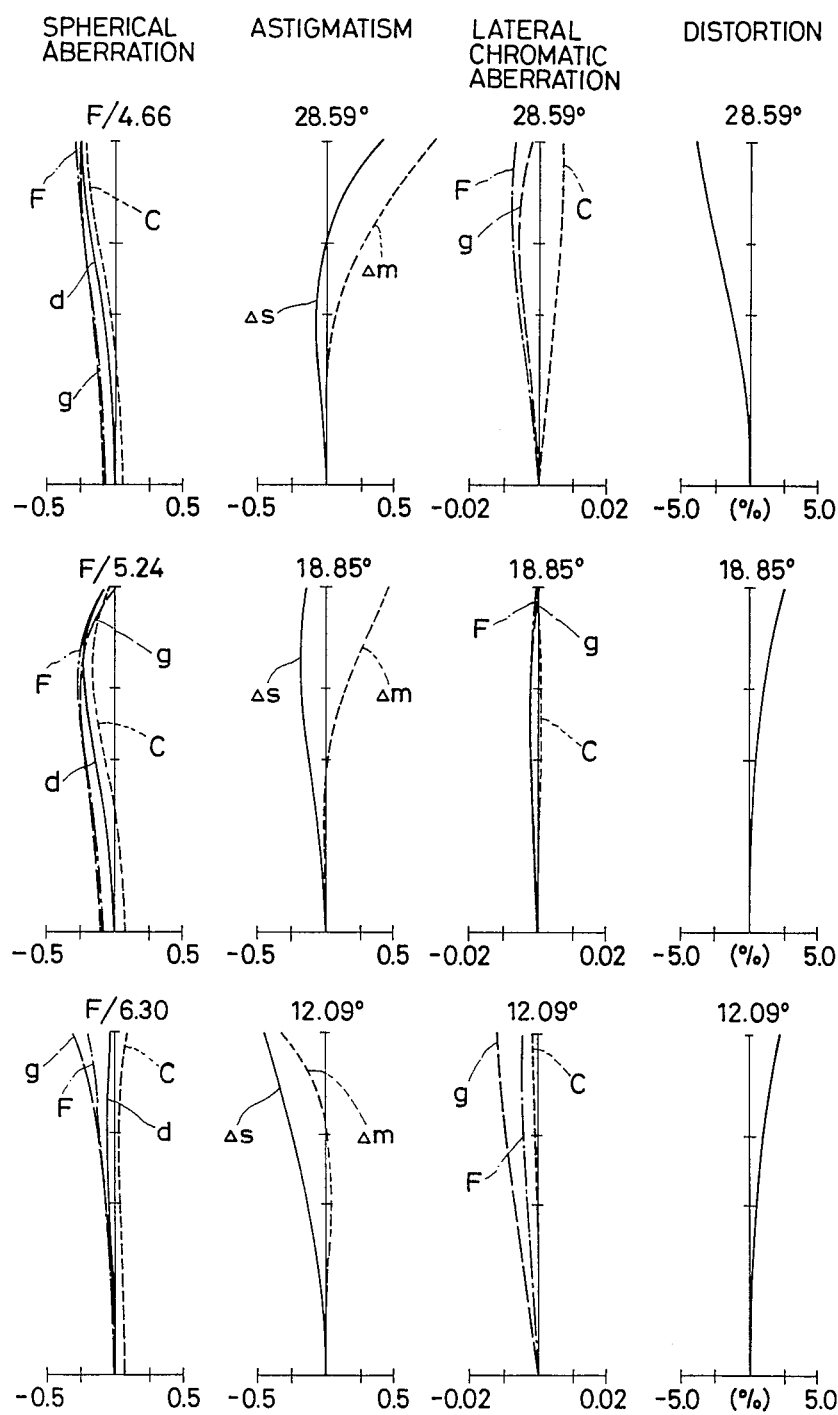
FIGS. 7 through 10 respectively show graphs illustrating aberration curves of embodiments 1 through 4 according to the present invention.

In the above-mentioned embodiments of the zoom lens system according to the present invention, embodiment 1 has the lens configuration as shown in FIG. 4. That is, the first lens group $G_1$ comprises a negative meniscus lens and two positive lenses, the second lens group $G_2$ comprises the front lens group $G_{21}$ having a negative lens and a positive lens and the rear lens group $G_{22}$ having two positive lenses, a negative lens and a positive lens, and the third lens group $G_3$ comprises a positive lens. The aberration curves of this embodiment in the wide-angle position, the standard position and the telephoto position are as shown in FIG. 7.

Figure 8:
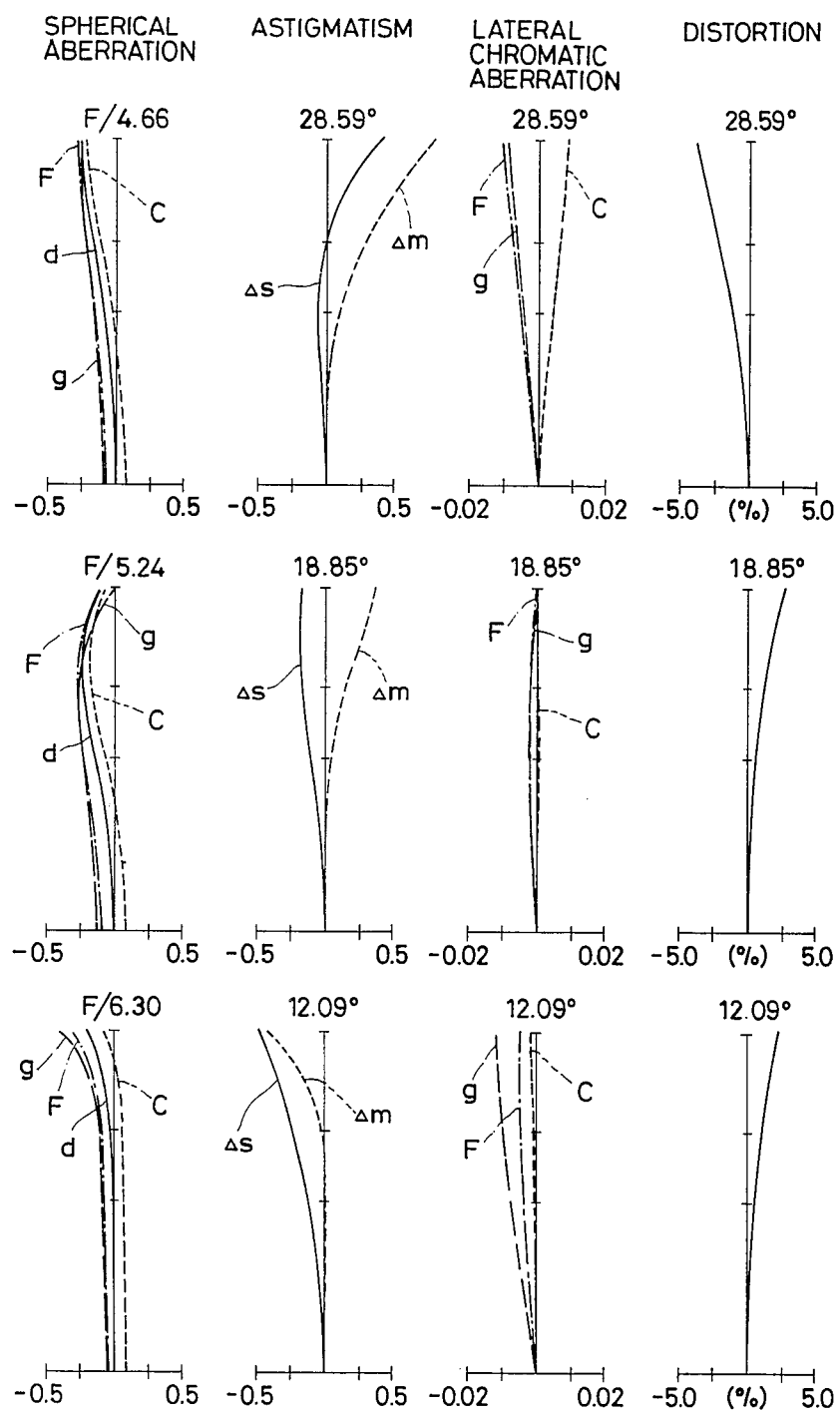

Embodiment 2 of the zoom lens system according to the present invention also has the lens configuration as shown in FIG. 4, but in this case, an aspherical surface is arranged on the image side surface ($r_{21}$) of the positive meniscus lens in the third lens group $G_3$. The aberration curves of this embodiment are shown in FIG. 8.

Figure 5:
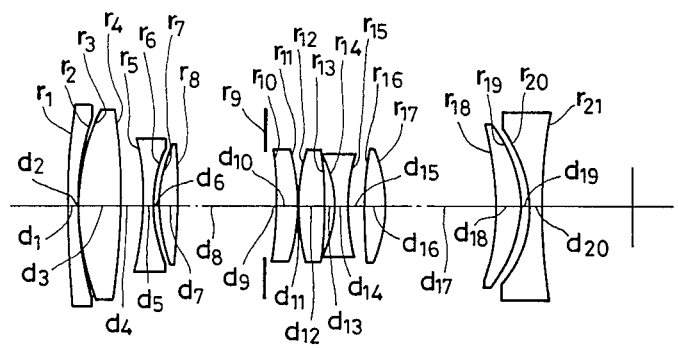
FIG. 5 shows a schematic sectional view of embodiment 3 according to the present invention.
Figure 9:
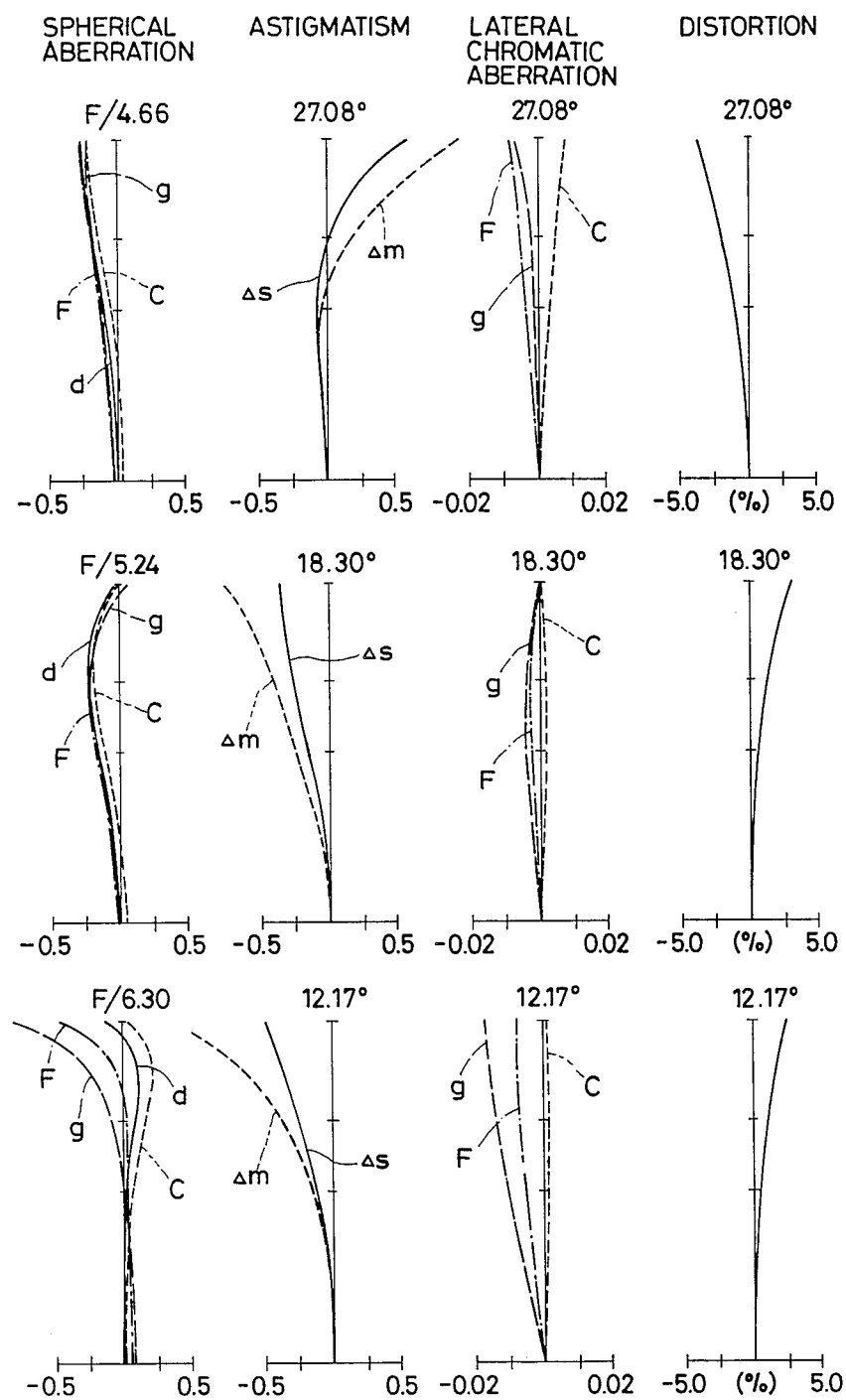

Embodiment 3 of the zoom lens system according to the present invention has the lens configuration as shown in FIG. 5, the first lens group $G_1$ comprises two lenses of a negative meniscus lens and a positive lens, and there is arranged an aspherical surface on the object side surface ($r_{20}$) of a negative lens in the third lens group $G_3$. The aberration curves of this embodiment are as shown in FIG. 9.

Figure 6:
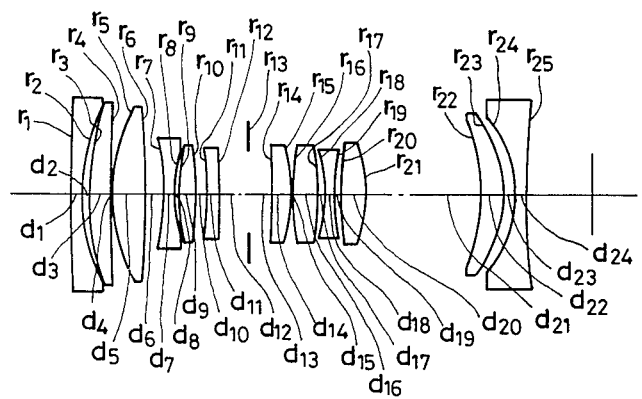
FIG. 6 shows a schematic sectional view of embodiment 4 according to the present invention.
Figure 10:
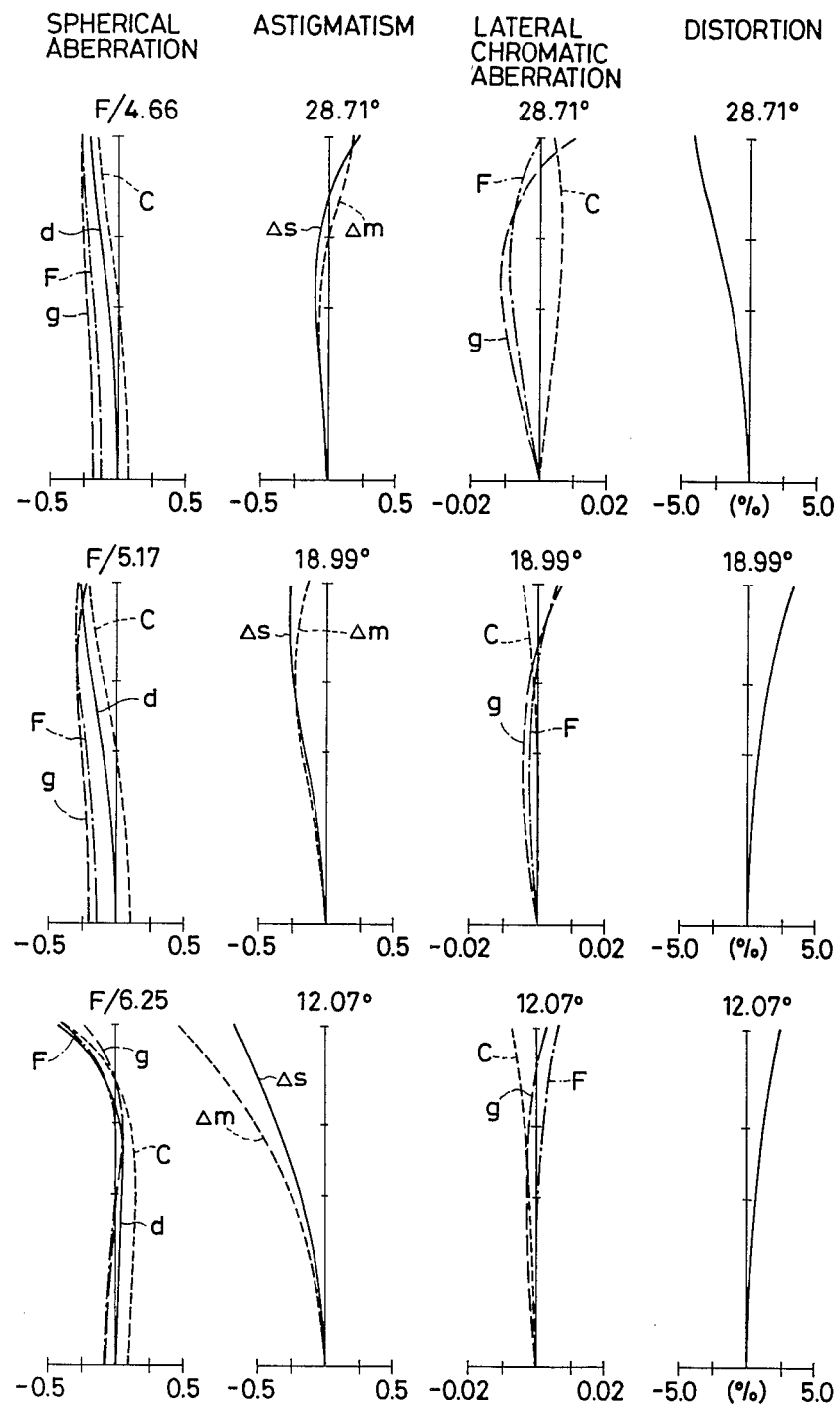

Embodiment 4 of the zoom lens system according to the present invention has the lens configuration as shown in FIG. 6, a negative lens is arranged after the positive lens of the front lens group $G_{21}$ in the second lens group $G_2$. The aberration curves of this embodiment are as shown in FIG. 10.

As is explained in detail in the above, the zoom lens system according to the present invention attains compactness due to the following. The three groups-type zooming system is employed so that the second and the third lens groups respectively have such function as increasing magnification during the zoom operation from the wide-angle position to the telephoto position to thereby efficiently attain the high zooming ratio. At the same time, the first lens group $G_1$ and the second lens group $G_2$ comprise one lens group having a positive refracting power as a whole, and this lens group and the third lens group $G_3$ having a negative refracting power constitute a telescopic type lens system to thereby shorten the back focal length. The distribution of the refracting power is so arranged that the third lens group $G_3$ has the comparatively large zooming ratio to thereby shorten the space between the principal point of the second lens group and that of the third lens group.

Moreover, the zoom lens system according to the present invention has the configuration comprising three lens groups to thereby decrease the number of lens components constituting each lens group, simplify the structure of the lens-barrel and shorten the total length of the lens system.

I claim:

1. A compact zoom lens system with a high zooming ratio comprising, in order from the object side, a first lens group having a positive refracting power, a second lens group having a positive refracting power and a third lens group having a negative refracting power, said compact zoom lens system with a high zooming ratio being arranged to be zoomed by respectively varying the spaces on the optical axis among said respective lens groups and to satisfy the following conditions:

$$0.4 < \phi_1/\phi_W < 0.9 \qquad (1)$$

$$1.1 < \phi_{12W}/\phi_W < 1.9 \qquad (2)$$

$$1.5 < \beta_{3T}/\beta_{3W} < 2.8 \qquad (3)$$

wherein reference symbol $\phi_W$ represents the refracting power of said zoom lens system as a whole in the wide-angle position, reference symbol $\phi_1$ represents the refracting power of said first lens group $G_1$, reference symbol $\phi_{12W}$ represents the total refracting power of said first lens group $G_1$ and said second lens group $G_2$ in the wide-angle position, reference symbol $\beta_{3W}$ represents the lateral magnification of said third leng group $G_3$ in the wide-angle position and reference symbol $\beta_{3T}$ represents the lateral magnification of said third lens group $G_3$ in the telephoto position.

2. A compact zoom lens system with a high zooming ratio according to claim 1, in which said first lens group comprises at least one negative lens component and at least one positive lens component, said second lens group comprises a front lens group having at least one negative lens component and at least one positive lens component and a rear lens group having two or more positive lens components and at least one negative lens component, and said third lens group comprises at least one positive lens component and at least one negative lens component.

3. A compact zoom lens system with a high zooming ratio according to claim 2, in which said first lens group comprises, in order from the object side, a negative meniscus lens having a convex surface thereof directed toward the object side, a positive lens and another positive lens to thereby arrange air-lens between said negative lens and said positive lens.

4. A compact zoom lens system with a high zooming ratio according to claim 2, in which said first lens group comprises two lens components having, in order from the object side, a negative meniscus lens with a convex surface thereof directed toward the object side and a positive lens.

5. A compact zoom lens system with a high zooming ratio according to claim 2, in which said second lens group comprises a front lens group having, in order from the object side, a negative lens and a positive lens, and a rear lens group having, in order from the object side, two positive lenses, a negative lens and a positive lens.

6. A compact zoom lens system with a high zooming ratio according to claim 2, in which said second lens group comprises a front lens group having, in order from the object side, a negative lens, a positive lens and a negative lens, and a rear lens group having, in order from the object side, two positive lenses, a negative lens and a positive lens.

7. A compact zoom lens system with a high zooming ratio according to claim 2, in which said second lens group comprises a front lens group having, in order from the object side, a doublet where a negative lens and a positive lens are cemented and a negative lens, and a rear lens group having, in order from the object side, two positive lenses, a negative lens and a positive lens.

8. A compact zoom lens system with a high zooming ratio according to claim 6, in which an air-lens is arranged between said negative lens and said positive lens which constitute said front lens group of said second lens group.

9. A compact zoom lens system with a high zooming ratio according to claim 2, in which said third lens group comprises, in order from the object side, a positive meniscus lens and a negative lens.

10. A compact zoom lens system with a high zooming ratio according to claim 3, in which there is arranged an aspherical surface expressed by the following formula when x is set as the direction of the optical axis, y is set as the vertical direction to the optical axis and the radius of curvature of said aspherical surface at the vertex thereof is set as $r_k$:

$$x_k = \frac{y_k^2}{r_k + r_k\sqrt{1 - (y_k/r_k)^2}} + A_k y_k^4 + B_k y_k^6 + C_k y_k^8 + D_k y_k^{10}$$

wherein $A_k$, $B_k$, $C_k$ and $D_k$ respectively represent the coefficients of said aspherical surface and k means that said aspherical surface is the k-th surface in said compact zoom lens system with a high zooming ratio.

11. A compact zoom lens system with a high zooming ratio according to claim 4, in which there is arranged an aspherical surface expressed by the following formula when x is set as the direction of the optical axis, y is set as the vertical direction to the optical axis and the radius of curvature of said aspherical surface at the vertex thereof is set as $r_k$:

$$x_k = \frac{y_k^2}{r_k + r_k\sqrt{1 - (y_k/r_k)^2}} + A_k y_k^4 + B_k y_k^6 + C_k y_k^8 + D_k y_k^{10}$$

wherein $A_k$, $B_k$, $C_k$ and $D_k$ respectively represent the coefficients of said aspherical surface and k means that said aspherical surface is the k-th surface in said compact zoom lens system with a high zooming ratio.

12. A compact zoom lens system with a high zooming ratio according to claim 3, in which said first lens group comprises a negative meniscus lens and two positive lenses, said second lens group comprises a front lens group having a negative lens and a positive lens and a rear lens group having two positive lenses, a negative lens and a positive lens and said third lens group comprises a positive meniscus lens and a negative lens, said compart zoom lens system with a high zooming ratio having the following numerical data:

| f = 39.7–101.0 2ω = 57.173°–24.179° | | F/4.66–6.3 |
|---|---|---|
| $r_1 = 349.6939$ | | |
| $d_1 = 1.5000$ | $n_1 = 1.83400$ | $\nu_1 = 37.16$ |
| $r_2 = 32.8369$ | | |
| $d_2 = 1.1000$ | | |
| $r_3 = 41.7711$ | | |
| $d_3 = 3.4800$ | $n_2 = 1.61700$ | $\nu_2 = 62.79$ |
| $r_4 = 298.9985$ | | |
| $d_4 = 0.2000$ | | |
| $r_5 = 28.3460$ | | |
| $d_5 = 5.2000$ | $n_3 = 1.51633$ | $\nu_3 = 64.15$ |
| $r_6 = -98.2782$ | | |
| $d_6 = D_1$ (variable) | | |
| $r_7 = -33.2301$ | | |
| $d_7 = 1.3000$ | $n_4 = 1.77250$ | $\nu_4 = 49.66$ |
| $r_8 = 21.7220$ | | |
| $d_8 = 0.8000$ | | |
| $r_9 = 27.4664$ | | |
| $d_9 = 2.5100$ | $n_5 = 1.80518$ | $\nu_5 = 25.43$ |
| $r_{10} = -442.8216$ | | |
| $d_{10} = 9.8233$ | | |
| $r_{11} = \infty$ (diaphragm) | | |
| $d_{11} = 1.9126$ | | |
| $r_{12} = -145.0362$ | | |
| $d_{12} = 2.8000$ | $n_6 = 1.62004$ | $\nu_6 = 36.25$ |
| $r_{13} = -30.1680$ | | |
| $d_{13} = 0.1000$ | | |
| $r_{14} = 25.4422$ | | |
| $d_{14} = 4.0000$ | $n_7 = 1.58904$ | $\nu_7 = 53.20$ |
| $r_{15} = -26.8413$ | | |
| $d_{15} = 1.1500$ | | |
| $r_{16} = -20.2236$ | | |
| $d_{16} = 1.6200$ | $n_8 = 1.74000$ | $\nu_8 = 28.29$ |
| $r_{17} = 28.1734$ | | |
| $d_{17} = 2.3620$ | | |
| $r_{18} = 56.8798$ | | |
| $d_{18} = 3.2900$ | $n_9 = 1.56873$ | $\nu_9 = 63.16$ |
| $r_{19} = -20.1313$ | | |
| $d_{19} = D_2$ (variable) | | |
| $r_{20} = -32.6159$ | | |
| $d_{20} = 3.2970$ | $n_{10} = 1.78472$ | $\nu_{10} = 25.68$ |
| $r_{21} = -18.0559$ | | |
| $d_{21} = 1.5068$ | | |
| $r_{22} = -17.1348$ | | |
| $d_{22} = 1.60$ | $n_{11} = 1.77250$ | $\nu_{11} = 49.66$ |

-continued r_{23} = 125.4215

| f | D_1 | D_2 |
|---|---|---|
| 39.7 | 3.799 | 18.09 |
| 63.37 | 10.836 | 9.229 |
| 101.0 | 15.815 | 2.637 |

$\phi_1/\phi_W = 0.568$   $\phi_{12W}/\phi_W = 1.342$   $\beta_{3T}/\beta_{3W} = 1.874$ wherein reference symbol f represents the focal length of the lens system as a whole, reference symbol F/ represents the relative aperture of the lens system, reference symbol 2ω represents the angle of view of the lens system, reference symbol $r_1, r_2, \ldots$ respectively represent radii of curvature of respective lens surfaces, reference symbol $d_1, d_2, \ldots$ respectively represent thicknesses of respective lenses and airspaces between respective lenses, reference symbol $n_1, n_2, \ldots$ respectively represent refractive indices of respective lenses and reference symbol $\nu_1, \nu_2, \ldots$ respectively represent Abbe's numbers of respective lenses.

13. A compact zoom lens system with a high zooming ratio according to claim 10, in which said first lens group comprises a negative meniscus lens and two positive lenses, said second lens group comprises a front lens group having a negative lens and a positive lens and a rear lens group having two positive lenses, a negative lens and a positive lens and said third lens group comprises a positive meniscus lens and a negative lens, said compact zoom lens system with a high zooming ratio having the following numerical data:

f = 39.7–101.0   F/4.66–6.3
2ω = 57.173°–24.179° r_1 = 349.6816
d_1 = 1.5000    n_1 = 1.83400    ν_1 = 37.16
r_2 = 33.1266
d_2 = 1.1000
r_3 = 40.4902
d_3 = 3.4800    n_2 = 1.61700    ν_2 = 62.79
r_4 = 265.0133
d_4 = 0.2000
r_5 = 29.1601
d_5 = 5.2000    n_3 = 1.51633    ν_3 = 64.15
r_6 = −98.4163
d_6 = D_1 (variable)
r_7 = −33.5563
d_7 = 1.3000    n_4 = 1.77250    ν_4 = 49.66
r_8 = 21.4788
d_8 = 0.8000
r_9 = 29.3344
d_9 = 2.5100    n_5 = 1.80518    ν_2 = 25.43
r_{10} = −202.5157
d_{10} = 9.8233
r_{11} = ∞ (diaphragm)
d_{11} = 1.9126
r_{12} = −140.9364
d_{12} = 2.8000    n_6 = 1.62004    ν_6 = 36.25
r_{13} = −29.7929
d_{13} = 0.1000
r_{14} = 26.3380
d_{14} = 4.0000    n_7 = 1.58904    ν_7 = 53.20
r_{15} = −26.3893
d_{15} = 1.1500
r_{16} = −20.3390
d_{16} = 1.6180    n_8 = 1.74000    ν_8 = 28.29
r_{17} = 27.7863
d_{17} = 2.3620
r_{18} = 58.0692
d_{18} = 3.2900    n_9 = 1.56873    ν_9 = 63.16
r_{19} = −19.7462
d_{19} = D_2 (variable)
r_{20} = −33.4189
d_{20} = 3.2970    n_{10} = 1.78472    ν_{10} = 25.68
r_{21} = −18.2086    (aspherical surface)

d_{21} = 1.5068
r_{22} = −17.1355
d_{22} = 1.60    n_{11} = 1.77250    ν_{11} = 49.66
r_{23} = 125.4196

| f | D_1 | D_2 |
|---|---|---|
| 39.7 | 3.689 | 18.101 |
| 63.37 | 10.743 | 9.229 |
| 101.0 | 15.773 | 2.637 |

Coefficients of the aspherical surface $A_{21} = -0.30556 \times 10^{-7}$
$B_{21} = -0.62359 \times 10^{-8}$
$C_{21} = -0.34506 \times 10^{-10}$
$D_{21} = 0.73479 \times 10^{-13}$ $\phi_1/\phi_W = 0.562$   $\phi_{12W}/\phi_W = 1.346$   $\beta_{3T}/\beta_{3W} = 2.132$ wherein reference symbol f represents the focal length of the lens system as a whole, reference symbol F/ represents the relative aperture of the lens system, reference symbol 2ω represents the angle of view of the lens system, reference symbol $r_1, r_2, \ldots$ respectively represent radii of curvature of respective lens surfaces, reference symbol $d_1, d_2, \ldots$ respectively represent thicknesses of respective lenses and airspaces between respective lenses, reference symbol $n_1, n_2, \ldots$ respectively represent refractive indices of respective lenses and reference symbol $\nu_1, \nu_2, \ldots$ respectively represent Abbe's numbers of respective lenses.

14. A compact zoom lens system with a high zooming ratio according to claim 11, in which said first lens group comprises a negative meniscus lens and a positive lens, said second lens group comprises a front lens group having a negative lens and a positive lens and a rear lens group having two positive lenses, a negative lens and a positive lens and said third lens group comprises a positive meniscus lens and a negative lens, said compact zoom lens system with a high zooming ratio having the following numerical data:

f = 42.32–100.285   F/4.66–6.30
2ω = 54.15°–24.346° r_1 = 125.1043
d_1 = 1.5000    n_1 = 1.80518    ν_1 = 25.43
r_2 = 47.5460
d_2 = 0.3000
r_3 = 36.1310
d_3 = 5.7526    n_2 = 1.60300    ν_2 = 65.48
r_4 = −90.2949
d_4 = D_1 (variable)
r_5 = −34.0683
d_5 = 1.3000    n_3 = 1.80610    ν_3 = 40.95
r_6 = 20.9841
d_6 = 0.8000
r_7 = 21.9772
d_7 = 2.5064    n_4 = 1.80518    ν_4 = 25.43
r_8 = −158.6470
d_8 = 12.5417
r_9 = ∞ (diaphragm)
d_9 = 1.9126
r_{10} = −49.9427
d_{10} = 3.1886    n_5 = 1.62374    ν_5 = 47.10
r_{11} = −24.3730
d_{11} = 0.1003
r_{12} = 27.7653
d_{12} = 4.0000    n_6 = 1.60700    ν_6 = 54.98
r_{13} = −35.8977
d_{13} = 1.0889
r_{14} = −17.0433
d_{14} = 1.9157    n_7 = 1.68893    ν_7 = 31.08
r_{15} = 27.5919
d_{15} = 2.3350
r_{16} = 47.4714
d_{16} = 3.2857    n_8 = 1.56873    ν_8 = 63.16

-continued $r_{17} = -16.6553$
$d_{17} = D_2$ (variable)
$r_{18} = -34.4099$
$d_{18} = 3.2968$    $n_9 = 1.80518$    $\nu_9 = 25.43$
$r_{19} = -17.9647$
$d_{19} = 1.5001$
$r_{20} = -16.9841$    (aspherical surface)
$d_{20} = 1.6014$    $n_{10} = 1.77250$    $\nu_{10} = 49.66$
$r_{21} = 96.8592$

| f | $D_1$ | $D_2$ |
|---|---|---|
| 42.32 | 3.418 | 15.977 |
| 65.427 | 8.457 | 8.12 |
| 100.285 | 11.922 | 2.5 |

Coefficients of the aspherical surface $A_{20} = -0.30778 \times 10^{-5}$
$B_{20} = 0.66899 \times 10^{-8}$
$C_{20} = 0.23522 \times 10^{-10}$
$D_{20} = -0.12635 \times 10^{-12}$ $\phi_1/\phi_W = 0.54$    $\phi_{12W}/\phi_W = 1.414$    $\beta_{3T}/\beta_{3W} = 2.103$ wherein reference symbol f represents the focal length of the lens system as a whole, reference symbol F/ represents the relative aperture of the lens system, reference symbol 2ω represents the angle of view of the lens system, reference symbol $r_1, r_2, \ldots$ respectively represent radii of curvature of respective lens surfaces, reference symbol $d_1, d_2, \ldots$ respectively represent thicknesses of respective lenses and airspaces between respective lenses, reference symbol $n_1, n_2, \ldots$ respectively represent refractive indices of respective lenses and reference symbol $\nu_1, \nu_2, \ldots$ respectively represent Abbe's number of respective lenses.

15. A compact zoom lens system with a high zooming ratio according to claim 6, in which said first lens group comprises a negative meniscus lens and two positive lenses, said second lens group comprises a front lens group having a negative lens, a positive lens and a negative lens and a rear lens group having two positive lenses, a negative lens and a positive lens and said third lens group comprises a positive meniscus lens and a negative lens, said compact zoom lens system with a high zooming ratio having the following numerical data:

f = 39.50–101.17    F/4.66–6.25
2ω = 57.42°–24.14°

$r_1 = 514.2920$
$d_1 = 1.6500$    $n_1 = 1.83400$    $\nu_1 = 37.16$
$r_2 = 29.9752$
$d_2 = 1.1000$
$r_3 = 38.3788$
$d_3 = 3.4800$    $n_2 = 1.61272$    $\nu_2 = 58.75$
$r_4 = 545.9696$

-continued $d_4 = 0.2000$
$r_5 = 26.6491$
$d_5 = 5.1985$    $n_3 = 1.56384$    $\nu_3 = 60.69$
$r_6 = -144.2861$
$d_6 = D_1$ (variable)
$r_7 = -35.8957$
$d_7 = 1.6000$    $n_4 = 1.78590$    $\nu_4 = 44.18$
$r_8 = 23.7432$
$d_8 = 0.7273$
$r_9 = 34.6847$
$d_9 = 2.6079$    $n_5 = 1.78470$    $\nu_5 = 26.22$
$r_{10} = -57.2934$
$d_{10} = 1.8842$
$r_{11} = -46.5250$
$d_{11} = 2.0000$    $n_6 = 1.69680$    $\nu_6 = 55.52$
$r_{12} = -147.2930$
$d_{12} = 4.5532$
$r_{13} = \infty$ (diaphragm)
$d_{13} = 3.5670$
$r_{14} = -124.2781$
$d_{14} = 2.8357$    $n_7 = 1.64769$    $\nu_7 = 33.80$
$r_{15} = -28.3627$
$d_{15} = 0.3311$
$r_{16} = 35.2215$
$d_{16} = 3.9213$    $n_8 = 1.62230$    $\nu_8 = 53.20$
$r_{17} = -40.9712$
$d_{17} = 1.0764$
$r_{18} = -22.1258$
$d_{18} = 1.5365$    $n_9 = 1.74000$    $\nu_9 = 28.29$
$r_{19} = 30.0629$
$d_{19} = 0.8217$
$r_{20} = 39.3474$
$d_{20} = 4.0885$    $n_{10} = 1.61272$    $\nu_{10} = 58.75$
$r_{21} = -19.5679$
$d_{21} = D_2$ (variable)
$r_{22} = -30.1423$
$d_{22} = 3.6788$    $n_{11} = 1.78472$    $\nu_{11} = 25.71$
$r_{23} = -18.6415$
$d_{23} = 1.6503$
$r_{24} = -17.9809$
$d_{24} = 1.7821$    $n_{12} = 1.77250$    $\nu_{12} = 49.66$
$r_{25} = 116.7552$

| f | $D_1$ | $D_2$ |
|---|---|---|
| 39.50 | 2.789 | 17.909 |
| 62.86 | 11.997 | 9.483 |
| 101.17 | 16.227 | 2.824 |

$\phi_1/\phi_W = 0.640$    $\phi_{12W}/\phi_W = 1.375$    $\beta_{3T}/\beta_{3W} = 2.050$ wherein reference symbol f represents the focal length of the lens system as a whole, reference symbol F/ represents the relative aperture of the lens system, reference symbol 2ω represents the angle of view of the lens system, reference symbol $r_1, r_2, \ldots$ respectively represent radii of curvature of respective lens surfaces, reference symbol $d_1, d_2, \ldots$ respectively represent thicknesses of respective lenses and airspaces between respective lenses, reference symbol $n_1, n_2, \ldots$ respectively represent refractive indices of respective lenses and reference symbol $\nu_1, \nu_2, \ldots$ respectively represent Abbe's numbers of respective lenses.

* * * * *